United States Patent [19]
Endo et al.

[11] Patent Number: 5,764,624
[45] Date of Patent: Jun. 9, 1998

[54] ATM SWITCHING SYSTEM AND PATH CHANGING METHOD

[75] Inventors: Noboru Endo, Kodaira; Masataka Takano, Yokohama, both of Japan

[73] Assignee: Hitachi, Ltd., Tokyo, Japan

[21] Appl. No.: 608,561

[22] Filed: Feb. 28, 1996

[30] Foreign Application Priority Data

Mar. 6, 1995 [JP] Japan .................................. 7-045249

[51] Int. Cl.$^6$ .................................................. H04L 12/56
[52] U.S. Cl. ............................................ 370/218; 370/392
[58] Field of Search .................................. 370/217, 218, 370/389, 392, 395, 397, 413

[56] References Cited

U.S. PATENT DOCUMENTS

| | | | |
|---|---|---|---|
| 5,398,236 | 3/1995 | Hemmady et al. | 370/218 |
| 5,434,864 | 7/1995 | Perlman et al. | 370/392 |
| 5,600,630 | 2/1997 | Takano et al. | 370/218 |

*Primary Examiner*—Benedict V. Safourek
*Attorney, Agent, or Firm*—Fay,Sharpe,Beall, Fagan,Minnich & McKee

[57] ABSTRACT

An ATM switching system at each node of a network performs route changing or rerouting promptly when a failure occurs. In each of ATM switching systems at nodes N1 to N6: a route table 21 of a line interface 102 is set with conversion header information of a normal route, and an alternate routing table 25 is set with header information of one or more alternate routes. Subsequently, each line interface tests, when a packet arrives, whether or not a failure has occurred in an output line involved in the normal route, by referring to a bitmap 264 storing failure lines and a VP failures. The line interface executes header conversion by applying the normal header information stored in the routing table 21 in the case of no failure set for the normal route and by applying the header information stored in the alternate routing table 25 in case a failure has occurred on the normal route, and then outputs the packet to an ATM switch 101. Since the alternate route is promptly selected at the time of a failure of a net line and not in response to decoding a header of a received packet, the number of packets discarded due to the failure is reduced, and the rerouting operation is promptly executed even in the case of multiple failures.

22 Claims, 14 Drawing Sheets

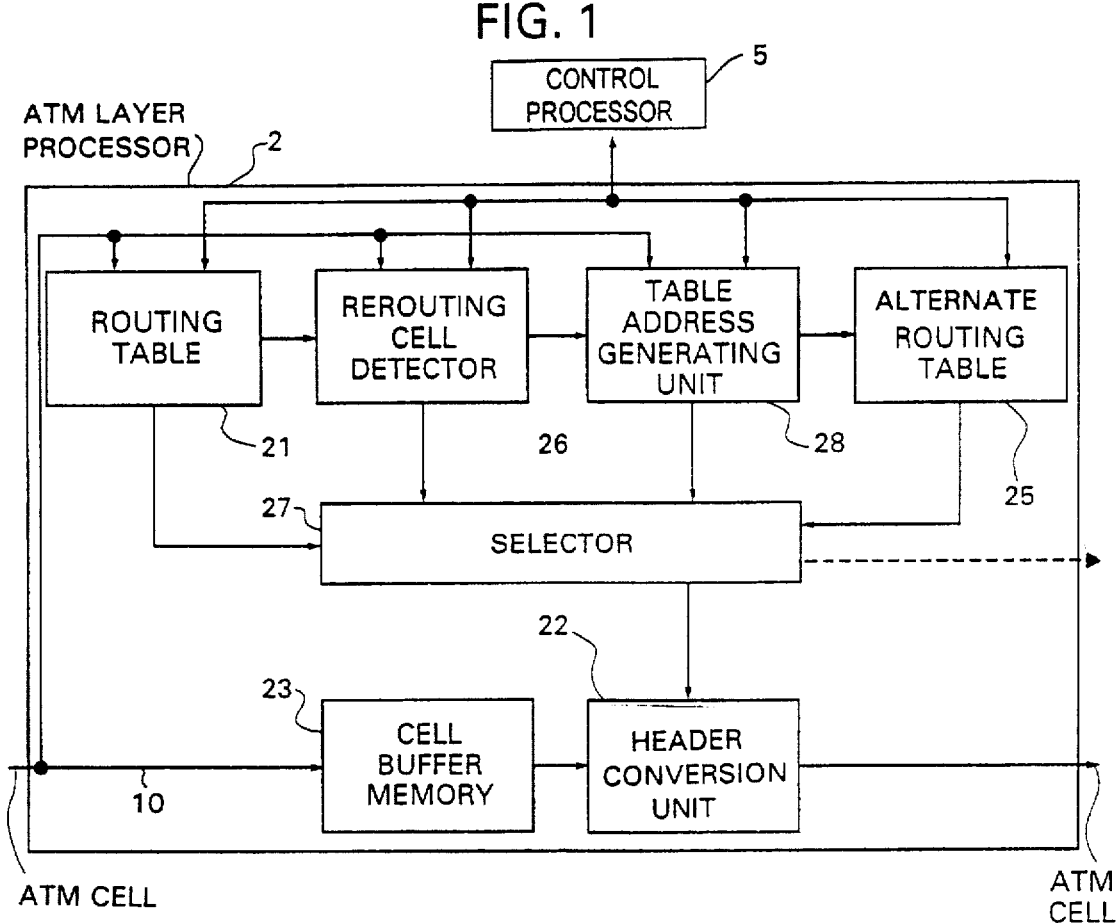

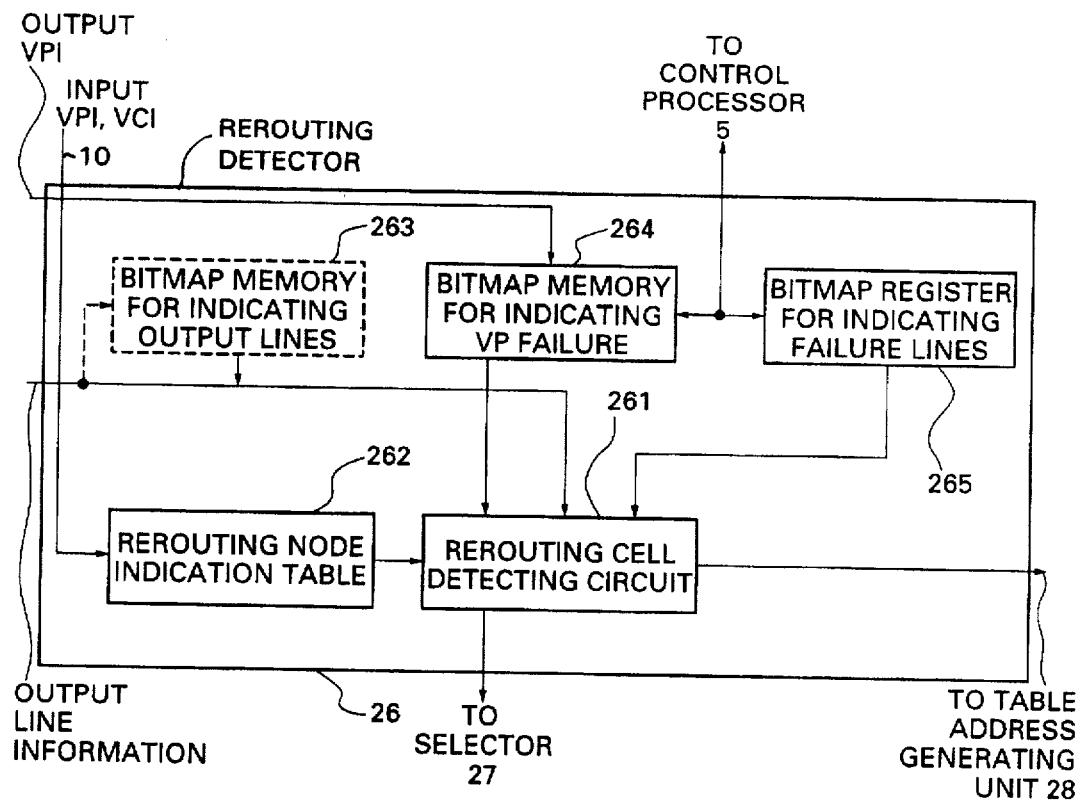

FIG. 10

| ROUTING TABLE | VPI OUTPUT | VCI OUTPUT | OUTPUT LINE INFORMATION 1 2 3 4 5 6 7 8 |
|---|---|---|---|
| | 7 | 54 | 0 0 1 1 0 0 0 0 |
| | 21a | 21b | 21c |

FIG. 11A

| ALTERNATING ROUTING TABLE ADDRESS | VPI OUTPUT | VCI OUTPUT | OUTPUT LINE INFORMATION 1 2 3 4 5 6 7 8 |
|---|---|---|---|
| 6 | 7 | 54 | 0 1 0 1 0 0 0 0 |
| | 25a | 25b | 25c |

| ALTERNATING ROUTING TABLE ADDRESS | VPI OUTPUT | VCI OUTPUT | OUTPUT LINE INFORMATION 1 2 3 4 5 6 7 8 |
|---|---|---|---|
| 8 | 7 | 54 | 0 0 1 0 1 0 0 0 |
| | 25a | 25b | 25c |

| ALTERNATING ROUTING TABLE ADDRESS | VPI OUTPUT | VCI OUTPUT | OUTPUT LINE INFORMATION 1 2 3 4 5 6 7 8 |
|---|---|---|---|
| 11 | 7 | 54 | 0 1 0 0 1 0 0 0 |
| | 25a | 25b | 25c |

| VPI INPUT | VCI INPUT | FAILURE LINE INFORMATION ||||||||  ALTERNATING ROUTE TABLE ADDRESS |
|---|---|---|---|---|---|---|---|---|---|---|
| | | 1 | 2 | 3 | 4 | 5 | 6 | 7 | 8 | |
| 3 | 41 | 0 | 0 | 1 | 0 | 0 | 0 | 0 | 0 | 6 |

CAM PORTION (281) / RAM PORTION (282)

FIG. 12B

| VPI INPUT | VCI INPUT | FAILURE LINE INFORMATION ||||||||  ALTERNATING ROUTE TABLE ADDRESS |
|---|---|---|---|---|---|---|---|---|---|---|
| | | 1 | 2 | 3 | 4 | 5 | 6 | 7 | 8 | |
| 3 | 41 | 0 | 0 | 0 | 1 | 0 | 0 | 0 | 0 | 8 |

CAM PORTION (281) / RAM PORTION (282)

FIG. 12C

| VPI INPUT | VCI INPUT | FAILURE LINE INFORMATION ||||||||  ALTERNATING ROUTE TABLE ADDRESS |
|---|---|---|---|---|---|---|---|---|---|---|
| | | 1 | 2 | 3 | 4 | 5 | 6 | 7 | 8 | |
| 3 | 41 | 0 | 0 | 1 | 1 | 0 | 0 | 0 | 0 | 11 |

CAM PORTION (281) / RAM PORTION (282)

FIG. 17A
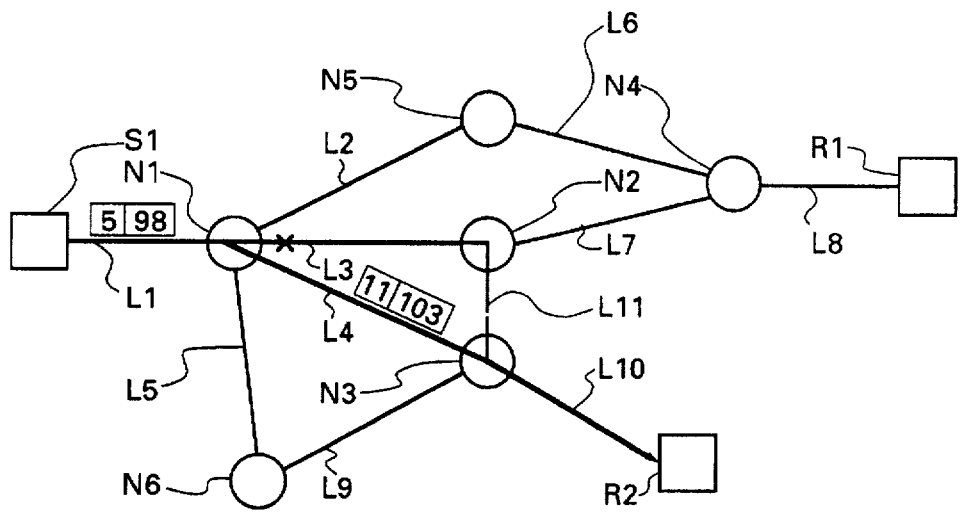
FIG. 17B
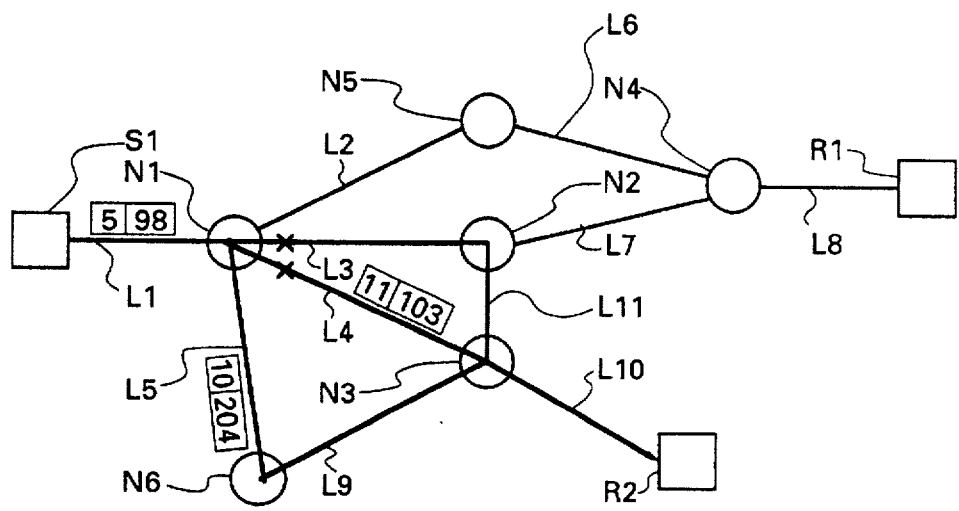
FIG. 18
| | VPI OUTPUT | VCI OUTPUT | OUTPUT LINE INFORMATION | | | | | | | |
|---|---|---|---|---|---|---|---|---|---|---|
| | | | 1 | 2 | 3 | 4 | 5 | 6 | 7 | 8 |
| 21 | 8 | 43 | 0 | 0 | 1 | 0 | 0 | 0 | 0 | 0 |
| | 21a | 21b | 21c | | | | | | | |

FIG. 19A

| ALTERNATING ROUTING TABLE ADDRESS | VPI OUTPUT | VCI OUTPUT | OUTPUT LINE INFORMATION | | | | | | | |
|---|---|---|---|---|---|---|---|---|---|---|
| | | | 1 | 2 | 3 | 4 | 5 | 6 | 7 | 8 |
| 15 | 11 | 103 | 0 | 0 | 0 | 1 | 0 | 0 | 0 | 0 |

FIG. 19B

| ALTERNATING ROUTING TABLE ADDRESS | VPI OUTPUT | VCI OUTPUT | OUTPUT LINE INFORMATION | | | | | | | |
|---|---|---|---|---|---|---|---|---|---|---|
| | | | 1 | 2 | 3 | 4 | 5 | 6 | 7 | 8 |
| 31 | 10 | 204 | 0 | 0 | 0 | 0 | 1 | 0 | 0 | 0 |

FIG. 20A

| CAM PORTION | | | | | | | | | | RAM PORTION |
|---|---|---|---|---|---|---|---|---|---|---|
| VPI INPUT | VCI INPUT | FAILURE LINE INFORMATION | | | | | | | | ALTERNATING ROUTE TABLE ADDRESS |
| | | 1 | 2 | 3 | 4 | 5 | 6 | 7 | 8 | |
| 5 | 98 | 0 | 0 | 1 | 0 | 0 | 0 | 0 | 0 | 15 |

FIG. 20B

| CAM PORTION | | | | | | | | | | RAM PORTION |
|---|---|---|---|---|---|---|---|---|---|---|
| VPI INPUT | VCI INPUT | FAILURE LINE INFORMATION | | | | | | | | ALTERNATING ROUTE TABLE ADDRESS |
| | | 1 | 2 | 3 | 4 | 5 | 6 | 7 | 8 | |
| 5 | 98 | 0 | 0 | 1 | 1 | 0 | 0 | 0 | 0 | 31 |

5,764,624

ATM SWITCHING SYSTEM AND PATH CHANGING METHOD

BACKGROUND OF THE INVENTION

The present invention relates to an asynchronous transfer mode (ATM) of a packet switching system including an ATM layer processor for route changing by selecting an alternate route upon failure of a packet communication route.

The ATM switching system constructing a node in an asynchronous transfer mode (ATM) network includes: an ATM switch having a plurality of input/output ports; a plurality of line interfaces connected to corresponding input/output ports; and a controller. Each line interface, includes: an input ATM layer processor connected with the input port of the ATM switch; an output ATM layer processor connected with the output port; a failure monitoring circuit connected between the input/output lines and each interface; and a control processor.

The ATM packet input to the line interface is checked by the failure monitoring circuit as to whether or not the input packet is an OAM (Operation, Administration and Maintenance) packet for failure management. If the input packet is the OAM packet, the failure information set in the packet is read out. If the input packet is another type of packet, it is input through the failure monitoring circuit onto an internal bus to the input ATM layer processor.

The input ATM layer processor converts the virtual path identifier (VPI) and the virtual channel (or connection) identifier (VCI) of the header information of the input packet into the VPI and VCI values for the output lines and then outputs the packet in the converted format (in which the output line information or the output port identifier or the internal routing information of the ATM switch is added by the conversion) to input port of the ATM switch.

The prior art ATM switch routes the packet, to the line interface determined by the output line information. In case this output line information has a plurality of output destinations for the broadcasting mode, the ATM switch makes necessary copies of the packet and transfers the copies respectively to the plurality of target line interfaces from output ports. Upon reception of the output of a packet from the ATM switch, each corresponding line interface sends the received packet to the output line through the failure monitoring circuit. The unnecessary output line information is removed in the output ATM layer processor.

The prior art input ATM layer processor 2 is composed, as shown in FIG. 23, of a routing table 21a, packet header conversion unit 22 and a packet buffer 23. The routing table 21 stores, as shown in FIG. 2, an output VPI 21a, an output VCI 21b and output circuit information 21c to correspond to the pair of the input VPI and the input VCI, so that the output VPI, the output VCI and the output line information for the header conversion are read out by using the input VPI and input VCI set in the header portion of the input packet as the address. The control processor of each line interface stores, in a manner to correspond to the connection, output line information of an alternate route, and an output VPI and an output VCI in an alternate routing table.

The packet, as input to the input ATM layer processor 2, is temporarily latched in the packet buffer 23. The output VPI/output VCI and the output line information are read out from the routing table 21 by using the VPI/VCI contained in the header portion as the address and are fed to the ATM packet header conversion unit 22. This packet header conversion unit 22 updates the VPI/VCI, as input from the buffer memory and present in the header portion of the ATM packet, into the output VPI/VCI read out from the routing table 21 and sends them to the ATM switch along with the output line information. According to the construction of the ATM switch, the output line information, as read out from the routing table 21, may be fed to the ATM switch in a format separate from the ATM packet.

The failure monitor circuit monitors not only the extraction of the failure information from the aforementioned OAM packet but also the status of the lines, the virtual path (VP) and the virtual channel (VC) and informs the controller of the failure, if detected, through the control processor. This control processor updates the output line information, the output VPI and the output VCI, which are stored in the routing table 21, into the output line information, the output VPI and the output VCI. By this updating of the routing table, the content of the header of the ATM packet is changed in the input ATM layer processor 2 for rerouting the packet.

SUMMARY OF THE INVENTION

In the ATM switching system of the prior art, as described above, rerouting at the time of a failure updates the routing table by the control processor of the line interface. As a result, particularly in the case of a large number of connections to be rerouted, this rerouting takes such a long time that many subsequent packets are discarded from a full buffer before the rerouting of a current packet is executed after the detection of a failure.

An object of the present invention is to provide an ATM switching system, an ATM layer processor and a rerouting capable of rerouting promptly when a failure occurs.

In order to achieve the object, an asynchronous transfer mode (ATM) switching system includes switchable connections between a plurality of input/output lines; stored header information for each connection to correspond to an output line for a normal time and another output line to act as an alternate route for a failure time; selecting, for each input packet received, at least one of the header informations in accordance with the presence or absence of a failure on the output line; and converting the content of the header portion of the input packet on the basis of the header information selected, wherein each input packet is output to the output line corresponding to the converted header information.

The header information includes output connection information (VPI/VCI) valid on the output line and an output line information for specifying the output line. In dependence upon the construction of the switch, the output line information may be input to the switch independently of the packet.

The input interface unit stores a plurality of header information for each of the possible connections to correspond to the plurality of output lines and at least one alternate route for each, so that the header information to be applied to the header conversion is selected according to the failure status of the output line. As a result, when a failure occurs on the output line or on a specific VP on the output line, the input packet can be promptly transferred to the output line for an alternate route having no failure by converting the header information to that for the alternate route.

At a packet route setting time, when failure has occurred on both the normal output line and an alternate output line, another previously stored alternate route is automatically selected for a prompt route change by preparing a plurality of alternate routes for each normal route and by storing a plurality of alternate header informations for respective alternate routes.

BRIEF DESCRIPTION OF THE DRAWINGS

Further objects, features and advantages of the present invention will become more clear from the following detailed description of a preferred embodiment, described with respect to the accompanying drawing:

FIG. 1 shows the input ATM layer processor 2 of FIG. 22;

FIG. 2 shows the conversion header information in the routing table 21 of FIGS. 1 and 23;

FIG. 3 shows the rerouting header information in the alternate routing table 25 of FIG. 1;

FIG. 4 shows the rerouting detector 26 of FIG. 1;

FIG. 10 shows an example conversion header information set in the routing table 21 of FIG. 1;

FIG. 11 shows an example of the rerouting header information set in the alternate routing table 25 of FIG. 1;

FIG. 12 is a diagram showing an example information set in the table address generator 28 of FIG. 1;

FIGS. 17(A) and 17(B) are diagrams for explaining the route changing when multiple failures have occurred in the connection C2 of FIG. 16;

FIG. 18 is a diagram of example conversion header information set in the routing table 21 of FIG. 1;

FIG. 19 shows an example rerouting header information set in the alternate routing table 25 of FIG. 1;

FIG. 20 is a diagram of example information set in the table address generator 28 of FIG. 1;

DETAILED DESCRIPTION OF A PREFERRED EMBODIMENT

Figure 21:
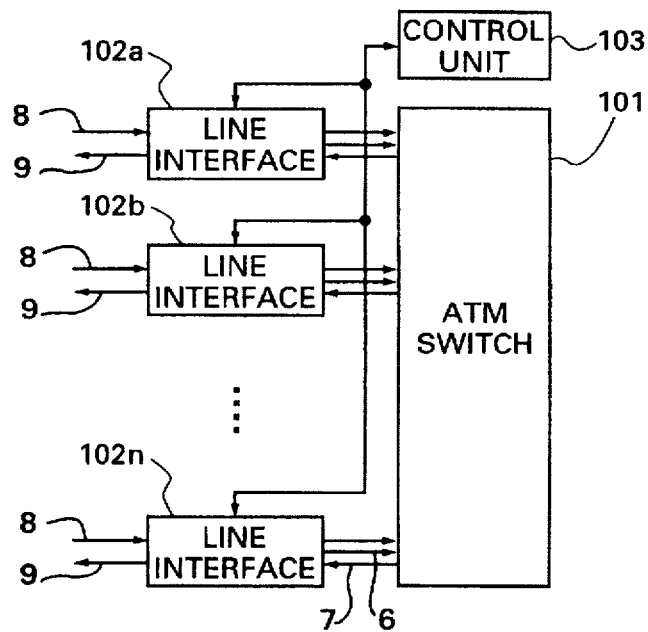
FIG. 21 shows the ATM switching system of the present invention that is at each node of FIG. 7.
Figure 22:
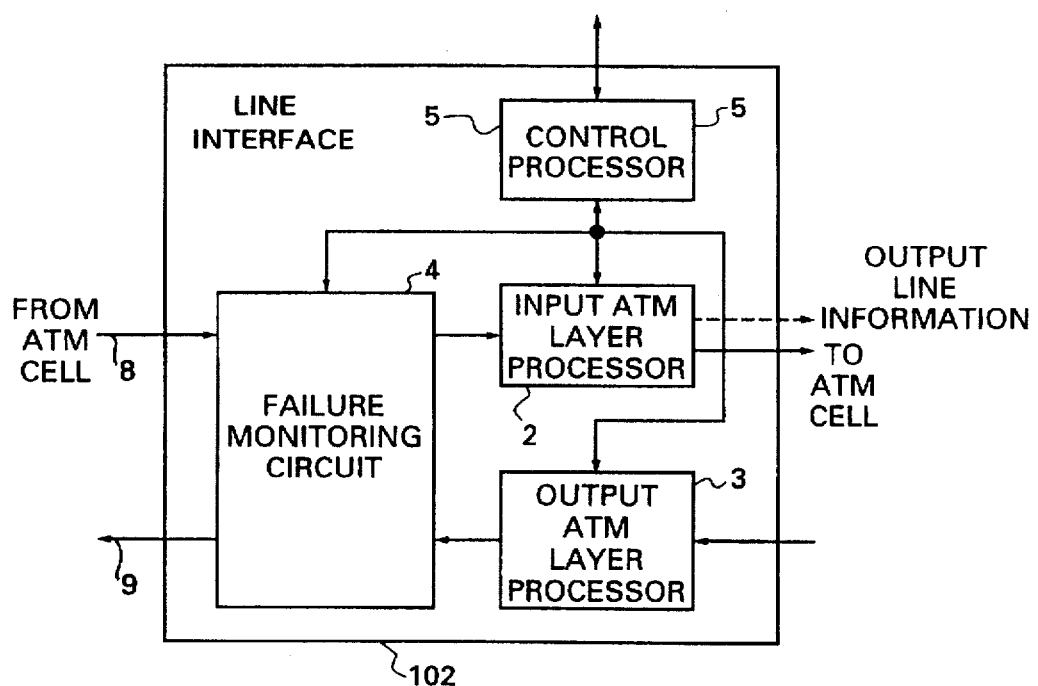
FIG. 22 shows the line interface 102 of the ATM switching system of FIG. 21 and which includes the processor of FIG. 1.
Figure 23:
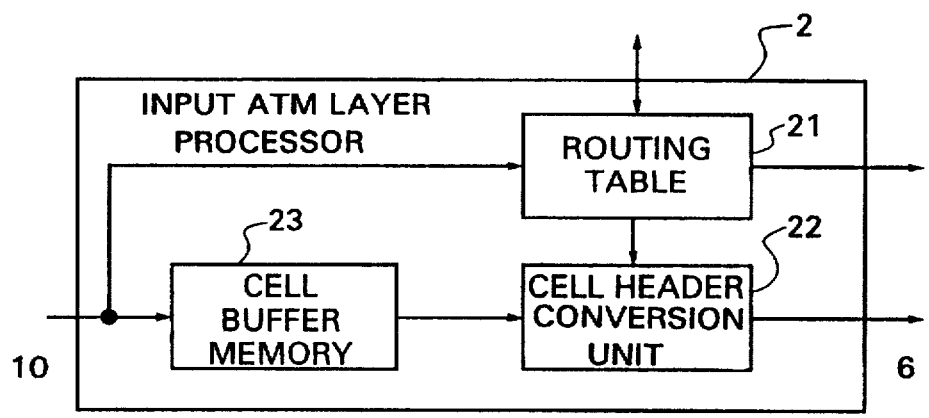
FIG. 23 shows one example of a conventional input ATM layer processor.

The ATM switching system constructing a node in an asynchronous transfer mode (ATM) network, as shown in FIG. 21, includes: an ATM switch 101 having a plurality of input/output ports 6, 7; a plurality of line interfaces 102 (102a to 102n) connected to corresponding input/output ports; and a controller 103. Each line interface 102, as shown in FIG. 22, includes: an input ATM layer processor 2 connected with the input port 6 of the ATM switch 101 of FIG. 2; an output ATM layer processor 3 connected with the output port; a failure monitoring circuit 4 connected between the input/output lines 8, 9 and each interface; and a control processor 5.

The ATM packet input on line 8 to the line interface 102 is checked by the failure monitoring circuit 4 as to whether or not the input packet is an OAM (Operation, Administration and Maintenance) packet for failure management. If the input packet is an OAM packet, the failure information set in the packet is read out. If the input packet is another type of packet, it is input through the failure monitoring circuit onto internal bus 10 to the input ATM layer processor 2.

The input ATM layer processor 2 converts the virtual path identifier (VPI) and the virtual channel (or connection) identifier (VCI) of the header information of the input packet into the VPI and VCI values for the output lines and then outputs the packet in the converted format (in which the output line information or the output port identifier or the internal routing information of the ATM switch is added by the conversion) to input port 6 of the ATM switch 101.

The ATM switch 101 routes the packet to the line interface 102 determined by the output line information. In case this output line information has a plurality of output destinations for the broadcasting mode, the ATM switch 101 makes necessary copies of the packet and transfers the copies respectively to the plurality of line interfaces 102 from output ports 7. Upon reception of the output of a packet from the ATM switch 101, each corresponding line interface 102 sends the received packet to the output line 9 through the failure monitoring circuit 4. The unnecessary output line information is removed in the output ATM layer processor 3.

An input ATM layer processor 2 of FIG. 1 is in each line interface 102 in the ATM switching system of FIG. 21, according to the present invention. The input ATM layer processor 2 is composed of a routing table 21, a packet header conversion unit 22, an input packet buffer 23, an alternate routing table 25, a rerouting detector 26, a selector 27 and a table address generator 28.

The routing table 21 stores conversion normal header information, composed of: a normal output VPI 21a, a normal output VCI 21b and normal output line information 21c, as shown in FIG. 2. This conversion normal header information 21a–c is read out at the address of the pair of the input VPI and input VCI contained in the header of the input packet.

The alternate routing table 25 stores, in a manner to correspond to the connection, conversion alternate header information, composed of: an alternate output VPI 25a, an alternate output VCI 25b and alternate output line information 25c, as shown in FIG. 3. This conversion alternate header information 25a–c is read out at the address output from the table address generator 28, in case a valid signal is output from the table address generator 28. Invalid data are output from the alternate routing table 25 when an invalid signal is output from the table address generator 28.

The ATM packet input on bus 10 to the input ATM layer processor 2 is temporarily latched in the packet buffer 23. At this same time, the input VPI and the input VCI, as extracted from the header of the input packet, are fed to the routing table 21 and the rerouting packet detector 26. As a result, the normal header information at the address of the input VPI and input VCI is read out from the routing table 21 and fed over bus 11 to the selector 27, and the normal output line information 21c and the normal output VPI 21a are fed over bus 12 to the rerouting detector 26.

The rerouting detector 26, as shown in FIG. 4, is composed of rerouting detector 261, a rerouting node table 262, an output line bitmap 263, an VP failure bitmap 264, and a failure line bitmap 265. The output line bitmap 263 is provided only if necessary.

The rerouting node table 262 stores information indicating whether or not the input ATM layer processor 2 should execute a reroute operation when a failure occurs on the output lines. The indication information can be read out at the address of the pair of the input VPI and the input VCI. The rerouting is executed if the indication information is set at "1", but not executed if set at "0".

The output line bitmap 263 is used to inform the table address generator 28 of output line information about each connection in the bitmap format. In case the output line information 21c read out from the routing table 21 is already in the bitmap format, the output line bitmap 263 is bypassed and need not be used and the output line information 21c from the routing table 21 may be fed directly to the rerouting detector 261. The output line information 21c of the routing table 21 is in the bitmap format, i.e. composed of a plurality of bits corresponding to the output ports of the ATM switch 101 such that the bit position corresponding to the destination output line of the input packet is set to "1" and the remaining bit positions are "0". When the output line information indicates the destination output line (or output port) for routing the input packet by a line number intrinsic to each output line, the line number is fed to the rerouting detector 261 after the line number has been converted into the bitmap format by the output line bitmap 263.

The VP failure bitmap 264 stores the later-described VP failure information in bitmap format, and the failure line bitmap 265 stores the failure line information in the bitmap format. These VP failure information and failure line information are provided by the control processor 5 shown in FIG. 22. The VP failure bitmap 264 and the failure line bitmap 265 are all reset to "0" as an initial status. When a failure occurs in a specific output VPI of a certain output line, the VP failure bitmap 264 is set to "1" in the position corresponding to the failure output line/output VPI. In case a failure occurs in the output line, the failure line bitmap 265 is set to "1" at the bit position corresponding to the failure output line. Upon recovery from the failure, the corresponding bit position is reset to "0".

In each line interface 102, the control processor 5 updates the contents of the VP failure bitmap 264 and the failure line bitmap 265, when informed of the failure information from the controller 103, with such updating being in accordance with the failure content. The failure line bitmap 265 stores appropriate bits to indicate the failure line, when so informed. The VP failure bitmap memory 264 stores appropriate bits to indicate the failure output line and the VP failure, when so informed of the VP failure.

The ATM layer processor 2 receives the ATM packet, and the conversion header information 21a-c is read out from the routing table 21. When the rerouting detector 26 supplies the output line information 21c and the output VPI 21a, it supplies the output line information to the rerouting detector 261 and read out the bitmap data corresponding to the output VPI 21a from the VP failure bitmap 264 and the failure line bitmap 265 to the rerouting detector circuit 261.

Figure 5:
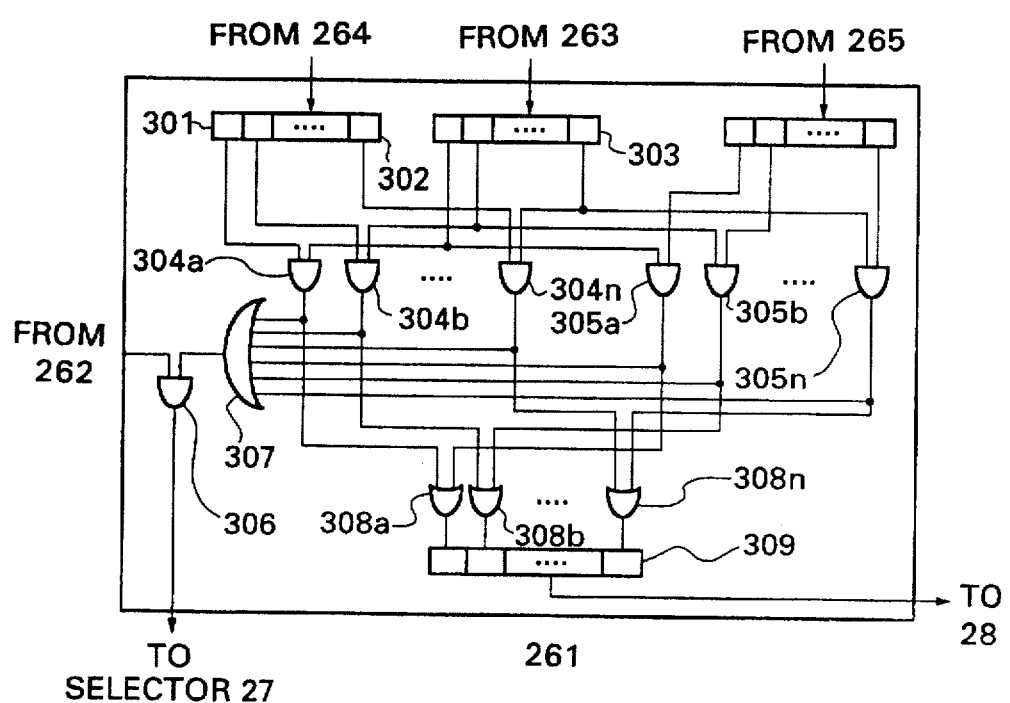
FIG. 5 shows the rerouting detecting circuit 261 of FIG. 4.

In FIG. 5 the rerouting detector 261 stores: the output line information 21c from the output line bitmap 263 into the latch 302; the data read out from the failure VP bitmap 264 into the latch 301; and the data read from the failure line bitmap 265 into the latch 303. The AND circuit 304 (304a to 304n) calculates the logical product of the bits of the latches 301 and 302 in the corresponding positional relationship. As a result, the output of the AND circuit 304 indicates line failure of the output lines, in the bitmap format. Likewise, the AND circuit 305 (305a to 305n) calculates the logical product of the bits of the latches 302 and 303 in the corresponding positional relation and the result indicates the VP failure of the output lines in the bitmap format. The OR circuit 308 (308a to 308n) calculates the logical sum of the bits of the outputs of the AND circuits 304 and 305 and the result indicates whether or not the VPI failure exists or the VP failure of the output lines in the bitmap format. The output of the OR circuit 308 is sent through the latch 309 to the table address generator 28. The OR circuit 307 calculates the logical sum of the output bits of the AND circuits 304 and 305. The output "1" of the OR circuit 307 implies that either the line failure or the VP failure occurs in the normal output line of the ATM packet received by the ATM layer processor 2. The output of the OR circuit 307 is input together with the output from the rerouting node table 262 to the AND circuit 306. When the normal output line of the input packet is in the failure status as indicated by "1" output from OR circuit 306, the rerouting node indication signal from the AND circuit 306 to the selector 27 is set at "1".

Figure 6:
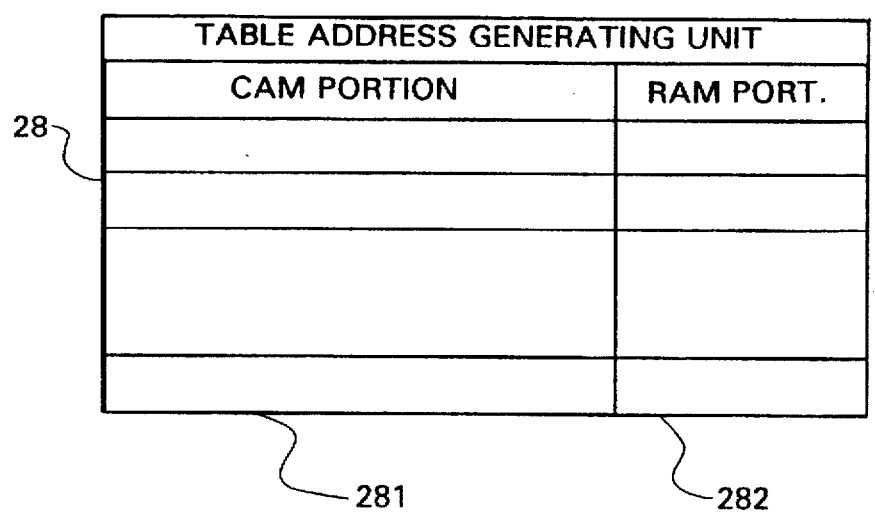
FIG. 6 shows a table address generator 28 of FIG. 1.

In FIG. 6, the table address generator 28 is constructed of an index CAM 28 (i.e., Content Addressable Memory) using a CAM portion 281 and a RAM portion 282. The CAM 281 stores a "tag" for identifying the data uniquely and the RAM portion 282 stores data to be retrieved. If a retrieval key is given to the index CAM 28, the data having the tag coincident to the retrieval key are read out from the RAM 282. The associative memory stores the combination of the tag and the data, and reads out the data in accordance with significant data designated in place of the read address in a normal memory access. The index CAM 281 is fed the retrieval key composed of the input VPI, the input VCI and the failure line information supplied from the rerouting detector 26. If a tag coincident with the retrieval key is in the CAM 281, the objective data is read out from the RAM 282. The data read out from the RAM 282 are the read address of the alternate routing table 25. At this time, the valid signal is applied to the alternate routing table 25 and the selector 27. When no coincident tag is present in the CAM 281, an invalid address is sent to the alternate routing table 25, and an invalid signal is sent to the alternate routing table 25 and the selector 27.

The selector 27 selects and feeds the alternate output data (i.e., the alternate output VPI, the alternate output VCI and the alternate output line information) of the alternate routing table 28, when the selector 27 receives the rerouting instruction from the rerouting detector 261 and the valid signal from the table address generator 28, and otherwise selects and feeds the normal output data (i.e., the normal output VPI, the normal output VCI and the normal output line information) of the routing table 21; and the selected output data is fed to the header conversion unit 22. The header conversion unit 22 updates the VPI and VCI of the header portion of the input ATM packet to the value of the output VPI and output VCI received from the selector 27, and sends the ATM cell together with output line information added to the header portion to the ATM switch 101. In case this ATM switch 1 has a bus structure in which the port interface of a plurality of output lines are connected by a common bus so that the port interface coincident with the address output to the address bus fetches the ATM packet on the data bus, the aforementioned output line information may be fed as a part of or separately of the packet header portion to the ATM switch 101.

In order to facilitate description of switching the output paths of the ATM packets, it is assumed that: the output line information is expressed in a bitmap corresponding to each output line, and that the value "1" is set in the bit position corresponding to the output line to send the packet whereas the value "0" is set in each bit position corresponding to other output lines; and the output line bitmap 263 passes the output line information from the routing table 21 to the rerouting detector 261.

Figure 7:
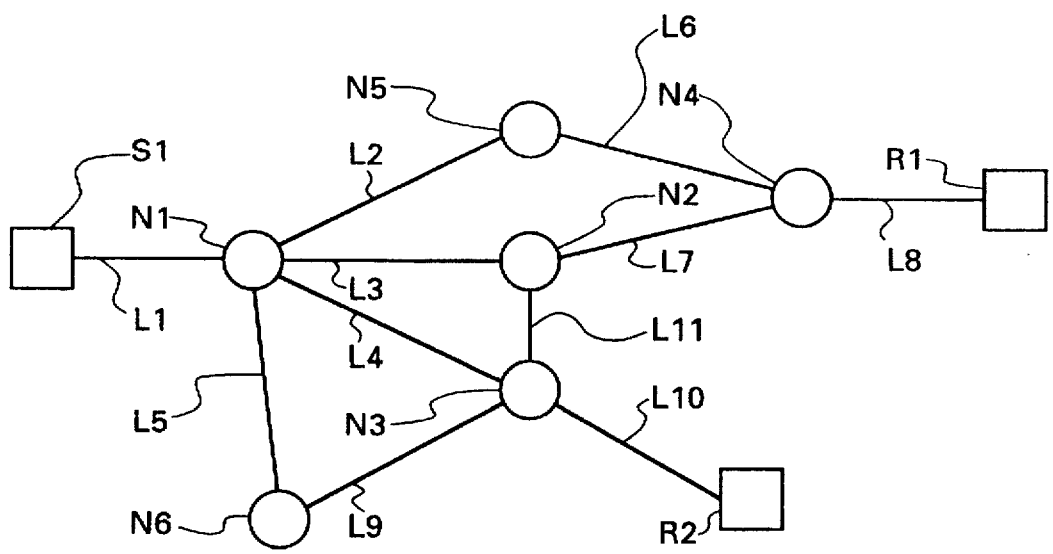
FIG. 7 shows a communication network employing plural processors of FIG. 1.

In FIG. 7, nodes N1, N2, N3, N4, N5 and N6 each includes an ATM switching system of FIGS. 21, 22 of the present invention; and communication lines L1, L2, L3, L4, L5, L6, L7, L8, L9, L10 and L11 connect the ATM switching systems of the nodes to form a network according to the present invention.

Figure 8:
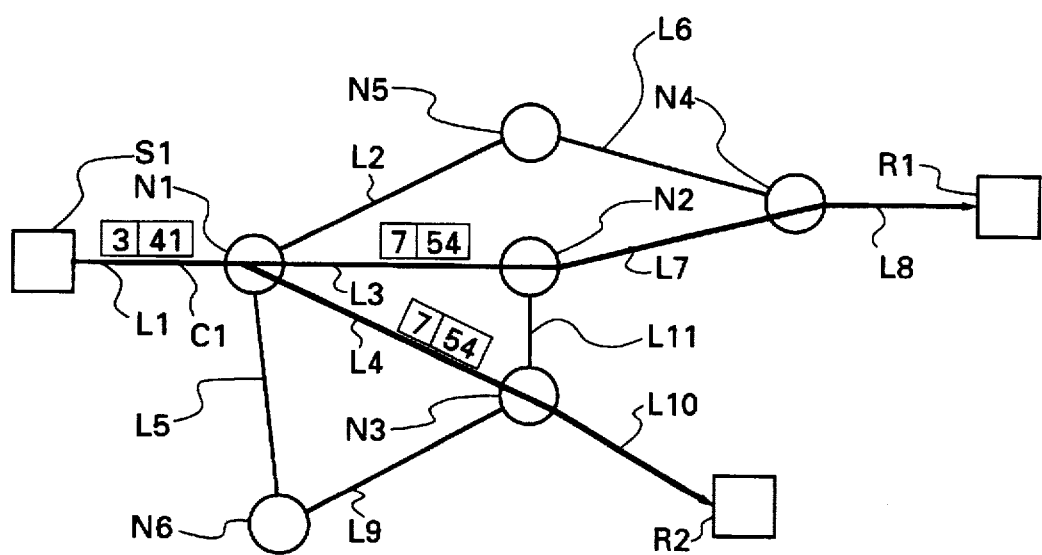
FIG. 8 shows a route of the multicasting connection C1 formed on the communication network of FIG. 7.

In FIG. 8, a multicasting connection C1 is set along the route indicated by thick lines from the sending terminal Si to the receiving terminals R1 and R2. The ATM packet input from the sending terminal Si to the ATM switching system of node N1 is multicast to the lines L3 and L4. The input VPI and input VCI of the ATM packet are at "3" and "41", respectively, and the output VPI and VCI of the output ATM packet output from the ATM switching system at node N1 are converted by being set at "7" and "54", respectively. The routing table 21 of the input ATM layer processor 2 connected with the line L1 of the ATM switching system at node N1 is set with the conversion header information shown in FIG. 10 to correspond to the multicast connection C1. The ATM exchanging system at node N1 has eight output lines (L1, L2, L3, L4, L5 are shown in FIG. 8), and the bit positions 1, 2, 3, 4, 5, 6, 7, 8, of the output line information (of 8 bits) correspond to the two-way, i.e. input/output communication lines L1, L2, L3, L4, L5, respectively.

The output line information of FIG. 10 has bit positions 3 and 4 set at "1", indicating that the input packets of the connection C1 (VPI="7" and VCI="54") should be output to the lines L3 and L4.

Figure 9A:
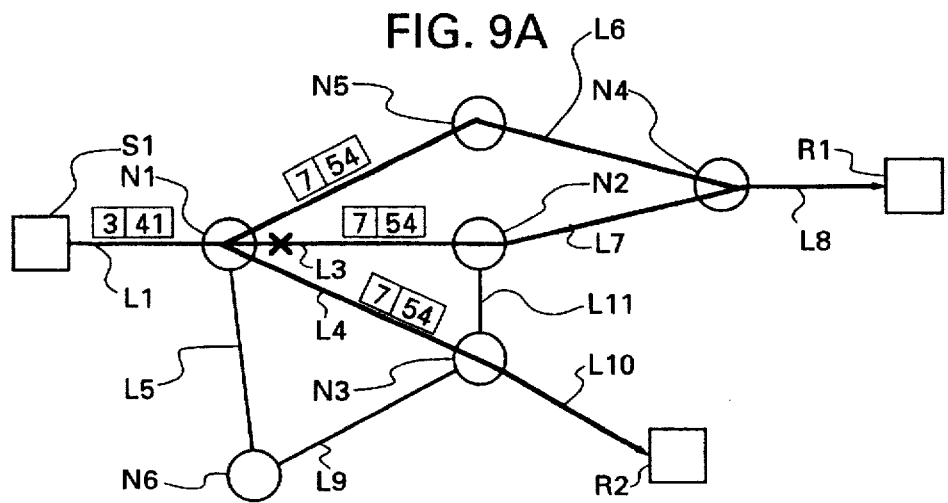
FIGS. 9(A), 9(B) and 9(C) are diagrams for explaining the route changing when failure occurs in the multicasting of connection C1 of FIG. 8.
Figure 9B:
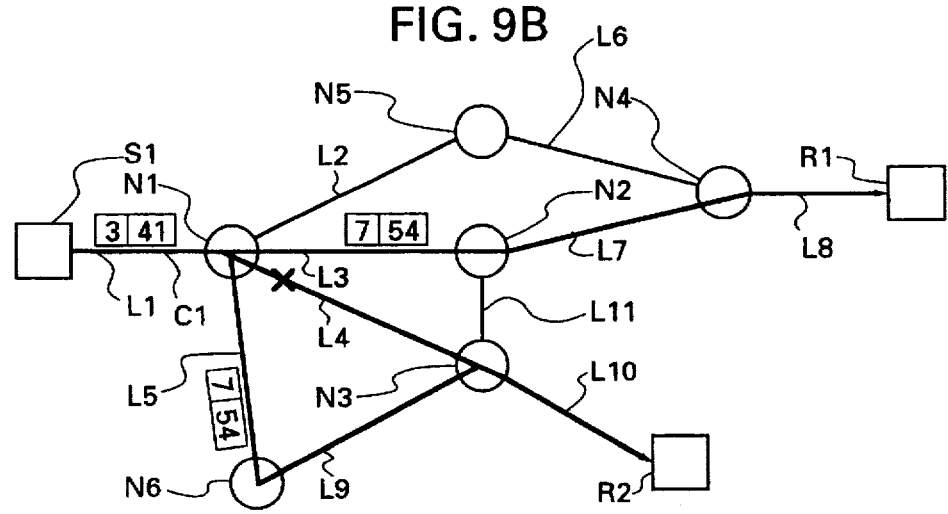

An alternate route is preset for the connection C1. FIG. 9(A) shows an alternate route to be selected by the ATM switching system at node N1 when a failure has occurred on the output line L3 (including failure on the line L7 or the associated ATM switching system of node N2). In this case, the ATM packet addressed to the receiving terminal R1 is output to the line L2 and transferred to the ATM switching system at node N4 through the ATM switching system at node N5 and the communication line L6. FIG. 9(B) shows an alternate route for the case in which a failure occurs on the line L4. The ATM packet addressed to receiving terminal R2 is output to the line L5 and transferred to the ATM switching system at node N3 through the ATM switching system at node N6 and the communication line L9.

Figure 9C:
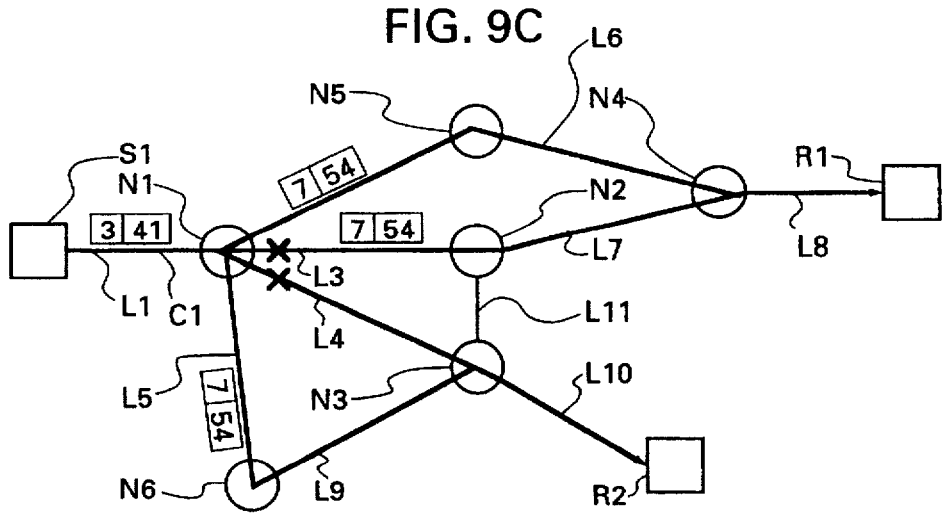

FIG. 9(C) shows an alternate route for the case in which the failures on lines L3 and L4 have occurred at the same line. The ATM packet addressed to the receiving terminal R1 is output to the alternate route line L2, as shown in FIG. 9(A), and the ATM packet addressed to the receiving terminal R2 is output to the alternate route line L5, as shown in FIG. 9(B).

For rerouting operations at a line failure time, in the ATM switching systems at nodes N3, N4, N5 and N6, the respective routing tables 21 are set with the routing information of the rerouting connection. Moreover, the line interface 102 of the ATM switching system at node N1 is set with information that is described in the following.

First of all, the alternate routing table 25 is preset (i.e. set before processing header information of the example input packet) with the rerouting header information, as shown in FIG. 11. The rerouting header informations are set for the alternate routes of FIGS. 9 (A), (B) and (C), respectively, to the addresses "6", "8" and "11" of the alternate routing table 25. In a manner to correspond to the rerouting header informations, the table address generator 28 is set with the information, as shown in FIG. 12. In the rerouting node table 262 of the rerouting detector 26 of FIG. 4, the value corresponding to the connection C1 is set to "1". The table address generator 28 is not set with data which corresponds to the failure line information having an all "0" pattern.

Figure 13A:
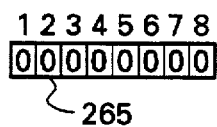
FIGS. 13(A) and 13(B) show the initial contents of the failure line bitmap 265 and the VP failure bitmap 264 of FIG. 4.
Figure 13B:
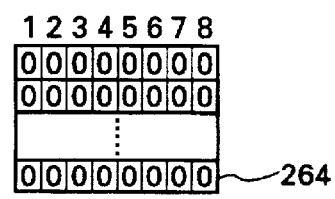

In the ATM switching system at node N1, at the initial setting, the failure line bitmap 265 and the VP failure bitmap 264 are wholly reset to "0", as shown in FIGS. 13(A) and 13(B), respectively.

When the ATM packet of the connection C1 is received from the line L1 and there is no failure in the output lines L3 and L4, the normal conversion header information (i.e., the normal output VPI 21a, the normal output VCI 21b and the normal output line information 21c), as shown in FIG. 10, are read out from the routing table 21 and fed to the selector 27, and the normal output VPI 21a and the normal output line information 21c are input to the rerouting detector 26. Since, at this time, all the outputs of the failure line bitmap 265 of FIG. 13(A) are at "0", all the output bits of the AND circuit 304 are at "0" in the rerouting detector 261. Since all the outputs of the VP failure bitmap 264 of FIG. 13(B) are at "0", all the values of the individual output bits of the AND circuit 305 also are "0". Although the output of the rerouting node table 262 are at "1", the OR circuit 307 outputs "0", and the AND circuit 306 outputs "0" so that the rerouting indication signal to the selector 27 is at "0". All the values of the latch 309 are at "0", and the table address generator 28 outputs, when it receives the latch 309 output as the retrieval key, the invalid signal and the invalid address to the alternate routing table 25 because the CAM unit has no coincident value. As a result, the alternate routing table 25 sends the invalid data to the selector 27. The selector 27 selects and sends the normal output of the routing table 21 to the header conversion unit 22 because the rerouting indication signal from the rerouting detector is at "0". As a result, the ATM switching system at node N1 sends the ATM packet of the connection C1 to the lines L3 and L4, as shown in FIG. 8.

In case a line failure occurs as discussed with respect to FIGS. 9(A), 9(B) and 9(C), the ATM switching system at node N1 operates as follows.

Figure 14A:
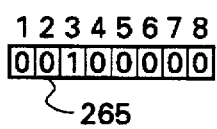
FIGS. 14(A) and 14(B) show the contents of the failure line bitmap 265 and the VP failure bitmap 264 of FIG. 4, when a failure occurs.

Here it is assumed that the failure monitoring circuit 4 detects a line failure of line L3 at a line interface 102 connected with the line L3. Each line interface 102 of the networks is informed of the line failure through the control processor 5 and the controller 103. The control processor 5 sets the bit position 3 of the failure line bitmap 265 of FIG. 14(A) of the rerouting detector 26 to "1".

Figure 15A:
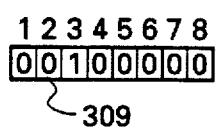
FIGS. 15(A), 15(B) and 15(C) show examples of retrieval key data output from the rerouting detector 26, of FIG. 1, to the table address generator 28, when failures occur.

With this status, when the ATM packet of the connection C1 is received from the communication line L1, the individual bits of the output of the AND circuit 305 of the rerouting detector 261 take the values shown in FIG. 15(A). Since all the outputs of the failure VP bitmap 264 are at "0", all the output bits of the AND circuit 304 are at "0". Since not only the output of the rerouting node table 262 but also the output of the OR circuit 307 is "1", the output of the AND circuit 306 is "1", so that the rerouting indication signal "1" is fed to the selector 27.

The latch 309 is set at the values shown in FIG. 15(A), which values are sent as the retrieval key to the table address generator 28. In the table address generator 28, the content (i.e., the address="6") of the RAM 282, whose CAM 281 has a content coincident to the aforementioned retrieval key, as shown in FIG. 12, is read out and sent together with the valid signal to the alternate routing table 25. The rerouting header information, as shown for address="6" in FIG. 11, is read out from the alternate routing table 25 and fed to the selector 27. The selector 27 feeds the output (i.e., the output VPI="7", the output VCI="54" and the output line information="01010000") of the alternate routing table 25 to the header conversion unit 22, because the rerouting indication signal at "1" is output from the rerouting detector 26 and because the valid signal is output from the table address generator 28. As a result, the input ATM packet is sent out to the output lines L2 and L4, as shown in FIG. 9(A).

In case the communication line L3 recovers from the line failure, each line interface 102 is informed of the line recovery through the control processor 5 and the controller 103. The control processor 5 resets the bit position 3 of the failure line bitmap 265 of the rerouting detector 26 to "0".

Next will be described the operations in the case of a VP failure.

Figure 14B:
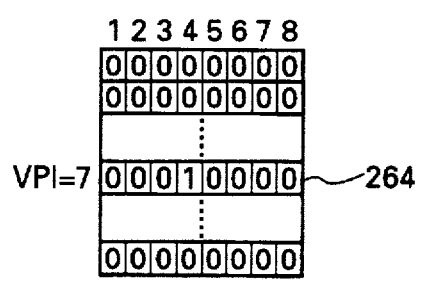
Figure 15B:
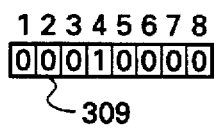

In case the failure monitoring circuit 4 of the line interface 102 connected with the communication line L4 detects a VP failure in which the VPI value is at "7", each line interface 102 is informed of the VP failure through the control processor 5 and the controller 103. The control processor 5 sets the bit position 4 of the VP failure bitmap 264 at the address of the VPI value "7" of the VP failure bitmap 264 of the rerouting detector 26 "7" as shown in FIG. 14(B). In this case the bitmap at the address corresponding to the VPI="7" of the VP failure bitmap 264 is in the status of FIG. 14(B), when the ATM packet of the connection C1 is received from the line L1. All the bits of the output of the AND circuit 304 of the rerouting detector 261 are at "0" because all the outputs of the failure line bitmap 265 are at "0". Therefore, the individual bits of the output of the AND circuit 304 determines the value 309 of OR circuit 308 as shown in FIG. 15(B).

Since the rerouting node table 262 has the output "1" and since the OR circuit 307 has the output "1", the rerouting indication signal "1" is output from the AND circuit 306 to the selector 27. The latch 309 is set with the output line information, as shown in FIG. 15(B), which is fed as the retrieval key to the table address generator 28. In the table address generator 28, the value (i.e., the address="8") of the RAM portion, whose CAM portion includes the contents coincident to the aforementioned retrieval key, as shown in FIG. 12, is read out and fed together with the valid signal to the alternate routing table 25.

The alternate routing table 25 reads out the rerouting header information of FIG. 11 at the address "8" and feeds it to the selector 27. The selector 27 feeds the alternate output (i.e., the alternate output VPI="7", the alternate output VCI="54", and the alternate output line information= "00101000") to the header conversion unit 22, because the rerouting indication signal from the rerouting detector 26 is at "1" and because the valid signal is output from the table address generator 28. As a result, the ATM packet is sent out to the output lines L3 and L5, as shown in FIG. 9(B).

In case the line L4 recovers from the VP failure of the VPI="7", each line interface 102 is informed of the VP recovery through the control processor 5 and the controller 103. At this time, the control processor 5 resets the bit position 4 of the bitmap corresponding to the address VPI="7" to "0" in the VP failure bitmap 264 of the rerouting detector 26.

Next will be described the operations of the case in which the line failure and the VP failure both occur.

The VP failure having the VPI="7" is detected at the line interface 102 connected with the line L4, for example, after the line failure has occurred on the line L3. The content of the failure line bitmap 265 changes to that shown in FIG. 14(A), and the content of the VP failure bitmap 264 at the address corresponding to the VPI="7" changes to that shown in FIG. 14(B).

Figure 15C:
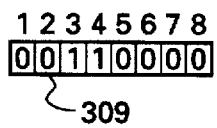

In the ATM switching system at node N12, when the ATM packet of the connection C1 is received from the line L1, the output bits of the AND circuit 305 in the rerouting detector 261 takes a value shown in FIG. 15(A), and the output bits of the AND circuit 309 takes a value shown in FIG. 15(B). The output of the rerouting node table 262 is "1", and the output of the OR circuit 307 is "1". As a result, the output of the AND circuit 306 is "1" so that the rerouting indication signal "1" is fed to the selector 27. Moreover, the latch 309 is set with the value shown in FIG. 15(C), which is fed as the retrieval key to the table address generator 28.

In the table address generator 28, the table address "11", whose CAM portion includes the contents coincident with the aforementioned retrieval key as shown in FIG. 12, is read out from the RAM portion 282 and is sent together with the valid signal to the alternate routing table 25. As a result, the rerouting header information, as latched at the address "11" shown in FIG. 11, is read out from the alternate routing table 25 and is fed to the selector 27. The selector 27 selects the output (i.e., the alternate output VPI="7", the alternate output VCI="54" and the alternate output line information= "01001000") of the alternate routing table 25 to send to the header conversion unit 22, because the rerouting indication signal from the rerouting packet detector 26 is "1" and the valid signal is input from the table address generator 28. As a result, the aforementioned ATM packet is sent out to the output lines L2 and L5, as shown in FIG. 9(C).

In case the output line L3 recovers from its line failure, each line interface 102 is informed of the line recovery through the control processor 5 and the controller 103. At this time, the control processor 5 resets the bit position 3 of the failure line bitmap 265 of the rerouting detector 26 to the value "0". In case the output line L4 recovers the VP failure of the VPI value="7", each line interface 102 is informed of the VP recovery through the control processor 5 and the controller 103. Then, the control processor 5 resets the value of the bit position 4 to "0" in the bitmap data corresponding to the VPI value="7", as latched in the VP failure bitmap 264 of the rerouting detector 26.

Next will be described the rerouting of the case in which a new failure occurs on the alternate line after the failure line or the VP failure line has been rerouted.

Figure 16:
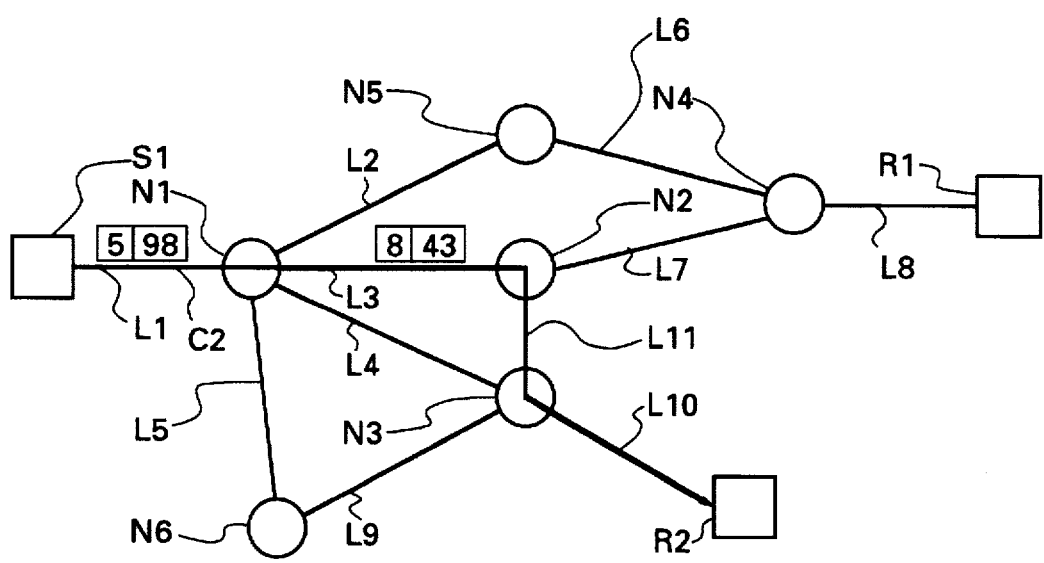
FIG. 16 shows the normal route connection C2 on the network of FIG. 7 for explaining the route changing when the multiple failures occur.

In the network of FIG. 16 having a construction of FIG. 7, it is assumed that the communication from the sending terminal S1 to the receiving terminal R2 is to be performed through a connection C2, as indicated by thick lines. Here, the VPI and VCI values of the ATM packet input from the line L1 to the ATM switching system at node N1 are "5" and "98", and the VPI and VCI values of the ATM packet output from the ATM switching system at node N1 to the line L3 are "8" and "43". In the ATM switching system at node N1, the routing table 21 of the input interface 2 connected with the line L1 is set with the normal conversion header information relating to the connection C2 as shown in FIG. 18. Now will be considered the case, in which the alternate lines L4 and L5 are successively set in place of the line L3, as shown in FIGS. 17(A) and 17(B), for the connection C2.

FIG. 17(A) shows an alternate route selected in case a failure occurs either on the output line L3 or in the ATM switching system at node N2 or the communication line L11 disposed downstream of the node N2. In this case, the ATM packet to be sent to the receiving terminal R2 reaches the ATM switching system at node N3 through the output line L4.

FIG. 17(B) shows a second alternate route selected in case a failure occurs on the output line L3 (or in the ATM switching system at node N2 or the communication line L11 downstream of the output line L3) and further on the alternate output line L4. The ATM packet addressed to the receiving terminal R2 reaches the ATM switching system at node N3 through the output line L5, the ATM switching system at node N6 and the communication line L9.

In order to execute a reroute operation for the aforementioned double failures, in the downstream ATM switching system at node N3 and the ATM switching system on the rerouted path, the routing table 21 at node N1 is set in advance of receiving or processing the packet addressed to R2 with the rerouting (L5 and L9) header informations as well as the conversion header information of the normal connection. That is, in the ATM switching system at node N1, the line interface 102 connected with the input line L1 is set in advance with the following table information. FIG. 19 shows the rerouting header informations set at the addresses "15" and "31" of the alternate routing table 25 and which correspond to the rerouting operations shown in FIGS. 17(A) and 17(B), respectively. FIG. 20 shows the address retrieval information set in the table address generator 28 in a manner to correspond to the aforementioned rerouting header informations. In the rerouting node table 262 of the rerouting detector 26, the value corresponding to the aforementioned connection C2 is set to "1".

If, in the ATM switching system at node N1, the failure monitoring circuit 4 of the line interface 102 connected with the line L3 detects that a line failure occurs on the line L3, the bit position 3 of the failure line bitmap 265 is set to "1" in a manner to correspond to the failure line L3. In a similar manner to that described with reference to FIG. 9, therefore, the address "15", as shown in FIG. 19, is read out from the table address generating unit 28 of FIG. 20. On the basis of this, the rerouting header information (i.e., the alternate output VPI="11", the alternate output VCI="103" and the alternate output line information="00010000"), as shown in FIG. 19 for address 15, is fed to the header conversion unit 22 so that when the ATM packet of the connection C2 arrives afterward, it is converted and sent out to the first rerouting output line L4, as shown in FIG. 17(A).

If, in this status, the failure monitoring circuit 4 of the line interface 102 connected with the line L4 detects that a line failure occurs on the output line L4, the bit position 4 of the failure line bitmap 265 is set to "1", and the failure line bitmap 265 indicates that the lines L3 and L4 are in the failure status. In this case, the address "31", as shown in FIG. 19, is read out from the table address generator 28. On the basis of this, the rerouting header information (i.e., the alternate output VPI="10", the alternate output VCI="204" and the alternate output line information="00001000"), as shown in FIG. 19 at the address 31, is fed to the header conversion unit 22 so that the ATM packet of the connection C2 having arrived afterward is converted and sent out to the second rerouting output line L5, as shown in FIG. 17(B).

A rerouting operation is promptly executed, even when multiple failures occur, by setting the alternate routing table in advance of processing (i.e., decoding the header of a packet whose header is to be converted) with the first alternate route to be selected in case a failure occurs in the route normally being used, and the second alternate route, the third alternate route, . . . and so on to be selected in case a failure occurs in the first alternate route, e t c. Although the foregoing multiple failure routing has been described in case a line trouble occurs in the alternate route, the same rerouting operations for the multiple failures are performed in case the VP failure occurs on the alternate route.

As has been apparent from t he description thus far, according to the present invention, each line interface of each ATM switching system at each node of a network stores in advance of processing, the conversion header information corresponding to the alternate route to be taken when a failure occurs, so that the rerouting is promptly executed in case a failure occurs in the network, to reduce the number of discarded packets. The rerouting operations are also promptly executed when the multiple failure s occur, by preparing the multiple alternate routes for each connection and by preparing the header information for each alternate route before receiving and processing the packet to be involved.

While a p referred embodiment of the present invention has been described in detail, variations and modifications are contemplated within the broader aspects of the present invention, in addition to the advantageous details, in accordance with the spirit and scope of the following claims.

We claim:

1. An asynchronous transfer mode (ATM) packet switching system, including:

a packet switch having a plurality of input/output lines, and being operable to form connections between said input and output lines so that an input packet received from an input line is routed to at least one output line according to a packet header content;

a storage for each connection, having a plurality of header information corresponding to an output line for a normal time and an output line for a failure time, respectively;

a selector, for each input packet, selecting and reading out at least one header information stored in said storage in accordance with the presence or absence of a failure on the output line for a normal time;

a header conversion unit for converting the content of the header portion of said input packet on the basis of the header information selected and read out by said selector; and said packet switch forming a connection to output the output packet to the output line corresponding to the header portion of the output packet.

2. A switching system as set forth in claim 1, further comprising a line interface for each of said input/output lines and each line interface including said storage, said selector and said header conversion unit.

3. A switching system as set forth in claim 1, wherein said header information includes an output connection information valid on said output line and an output line information for specifying said output line, wherein said header conversion unit replaces the output connection information contained in the header portion of each input packet by the output connection information indicated by the header information selected by said selector, and thereafter outputs the output packet to said switch.

4. A switching system as set forth in claim 1,
wherein said storage includes: a first table storing first header information for sending the input packet to a normal output line, and a second table storing second header information for sending the input packet to an alternate output line; and
wherein said selector includes: status storage storing status information including presence or absence of a failure on a plurality of the output lines, and reading out the first header information corresponding to a connection identifying information contained in the header portion of the input packet, from said first table; and select control means for deciding a status of the first output line specified by the first header information read out from said first table means, by a failure status information stored in said status storage, to feed said first header information to said header conversion unit when the first output line is normal, and to read out and feed the second header information specified by the combination of the connection identifying information of the input packet and the failure status of the output line to said header conversion unit when a failure occurs on said first output line.

5. A switching system as set forth in claim 4,
wherein said selector includes a table address generator outputting a table address corresponding to the combination of the connection identification information of the input packet and the failure status of the output line, so that said second header information is read out from said second table on the basis of the table address output by said address generating means.

6. A switching system as set forth in claim 4:
wherein the header information stored in said first and second tables are an output connection information and an output line information for specifying the output line;
wherein said selector feeds said header conversion unit with the output connection information read out from said first or second table, and feeds said switch with said output line information;
wherein said header conversion unit replaces the connection information contained in the header portion of the input packet, by the output connection information fed from said selector, and supplies the output connection information to said switch; and
wherein said switch transfers each output packet input from said header conversion unit to the output line specified by the output line information input from said selector.

7. A switching system as set forth in claim 4,
wherein said status storage stores whether or not a physical failure occurs on each output line and whether or not a failure occurs on each output line for each of multiple connections.

8. A switching system as set forth in claim 1,
wherein said storage stores said header information in a manner to correspond to a plurality of output lines to output packets at a normal time for any connection so that the input packets of said connection may be multicast to a plurality of output lines.

9. An asynchronous transfer mode (ATM) packet switching system comprising:

a switch having a plurality of input and output ports to be connected to input/output lines;

a plurality of line interfaces connected between said input and output ports and the input/output lines;

a call controller connected with each of said line interfaces and said switch to control switch connection between said input and output ports, so that an input packet received from an input line is routed to at least one output port as determined according to content of a header portion of the packet;

each of said line interfaces including:

first header generating means for generating and storing first header information to route the input packet to the output port along a route designated in advance as a normal route in a manner to correspond to one of said connections, wherein said storing is completed prior to said line interface receiving the input packet;

second header generating means for generating and storing second header information to route the input packet to another output line along another route designated in advance as an alternate route in a manner to correspond to another of said connections, wherein said storing is completed prior to said line interface receiving the input packet; and header conversion means for converting the header portion of each input packet to include the first header information when the output lines of the normal route are normal, and to include the second header information when there is a failure on the output line of said normal route; and wherein said switch forms said one or another connection that transfers the input packet, received from the input line, to the output line corresponding to the header information applied by said header conversion means.

10. A switching system as set forth in claim 9, wherein said header conversion means includes status storage means for storing the presence or absence of a failure for each of the output lines, wherein said storing is completed prior to said line interface receiving the input packet so that the status of the output line specified by the first header information generated by said first header generating means is decided prior to receiving each input packet by the stored information of said status storage means.

11. A switching system as set forth in claim 9, wherein said header conversion means includes: status storage means for storing the presence or absence of a failure on each of the output lines, wherein said storing is completed prior to said line interface receiving the input packet;

means for deciding status of the first output line specified by the first header information generated by said first header generating means, by the stored information of said status storage means;

means for feeding said second header generating means with connection identification information of each input packet and address information as determined by the status of the output line; and wherein said header conversion means selects some of said first header information and said second header information according to said address information.

12. A switching system as set forth in claim 9, wherein said header conversion means includes: status storage means for storing the presence or absence of a failure on each of the output lines, wherein said storing is completed prior to said line interface receiving the input packet;

means for deciding status of the first output line specified by the first header information generated by said first header generating means, by the stored information of said status storage means;

means for feeding said second header generating means with connection identification information of each input packet and address information as determined by the status of the output line; and wherein said header conversion means selects some of said first header information and said second header information according to said address information.

13. An output path changing method performed in an asynchronous transfer mode (ATM) of a packet switching system forming connections between a plurality of input and output lines, comprising the steps of:

at a connection setting time, designating one route with one output line as a normal route and at least another route with another output line as an alternate route and storing of a plurality of header information to be applied to header conversion of input packets in a manner to correspond to said normal route and alternate route;

thereafter, each time an input packet is received from one of the input lines, retrieving from storage the header information corresponding to the normal route or alternate route selectively and using retrieved header information for the header conversion of the input packet in response to presence or absence of a failure on the output lines of the normal route; and outputting the input packet through the switch to the output line corresponding to the header information applied by said header conversion.

14. A path changing method as set forth in claim 13, wherein said storing of header information is in a line interface connected with each input and output line.

15. A path changing method as set forth in claim 14, further comprising:

updating storage of output line status when a failure occurs on any output line and when an output line recovers from the failure, in each line interface; and each time the input packet is received in the interface, determining the presence or absence of a failure on the output line of a normal route to output said input packet on the basis of the storage of output line status and on the basis of said deciding, selecting the header information corresponding to the output line designated as the alternate route and effecting the header conversion of the input packet when a failure status is decided as to the output line of the normal route.

16. A path changing method as set forth in claim 13, wherein said designating and storing, for at least one connection, stores a plurality of output lines to act as multiple alternate routes to be used in said step of retrieving in a predetermined order based in the event of multiple failures.

17. A path changing method as set forth in claim 13, wherein said designating and storing, for at least one connection of packet multicasting, stores a plurality of output lines to act as multiple normal routes, and a plurality of output lines to act as multiple alternate routes.

18. An ATM layer process or to be inserted into input line of an asynchronous transfer mode (ATM) node system having a plurality of input/output lines, comprising:

first header generating means for generating and storing first header information to be applied to a normal header conversion in a manner to correspond to a connection to a normal output line, wherein said storing is completed prior to said line interface receiving the input packet;

second header generating means for generating and storing second header information to be applied to a header conversion when a failure occurs on an output line, in a manner to correspond to an alternate connection, wherein said storing is completed prior to said line interface receiving the input packet; and header conversion means for converting the header portions of individual input packets selectively in a manner to correspond to the input packet received from the input line, by applying the first header information generated by said first header generating means when the normal output line is normal, and by applying the second header information generated by said second header generating means when a failure occurs on the normal output line.

19. An ATM layer processor according to claim 18, wherein said header conversion means includes status storage means for storing the presence or absence of a failure for each output line of said node system as a failure status, and means for determining failure status of the normal output line specified by said first header information for each input packet by stored information of said status storage means; and said header conversion means selecting one of said first header information and said second header information in response to said determining.

20. An ATM layer processor according to claim 19, wherein said header conversion means further includes means for feeding said header conversion means with the one of the first header information and second header information comprising connection identification information and address information determined by the failure status of the normal output line.

21. An ATM layer processor according to claim 20, wherein said status storage means stores the presence or absence of a failure of each output line in terms of a bitmap having indication bits corresponding to the output lines, and wherein said means for determining decides the failure status of the normal output line in terms of said bitmap.

22. An ATM layer processor according to claim 21, wherein said status storage means determines and stores said bitmap depending upon the failure status of a physical packet connection route of each output line and failure of a virtual route.

* * * * *